United States Patent
Dor

(10) Patent No.: US 10,530,673 B2
(45) Date of Patent: Jan. 7, 2020

(54) TELEMETRY FOR SERVERS AND DEVICES USING A LINK-LAYER PROTOCOL

(71) Applicant: Mellanox Technologies TLV Ltd., Raanana (IL)

(72) Inventor: Shachar Dor, Rosh Ha'ayin (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 156 days.

(21) Appl. No.: 15/861,699

(22) Filed: Jan. 4, 2018

(65) Prior Publication Data
US 2019/0207832 A1 Jul. 4, 2019

(51) Int. Cl.
*G06F 15/173* (2006.01)
*H04L 12/26* (2006.01)
*H04L 12/24* (2006.01)
*H04B 3/46* (2015.01)

(52) U.S. Cl.
CPC .............. *H04L 43/06* (2013.01); *H04L 41/12* (2013.01); *H04L 41/5054* (2013.01); *H04B 3/46* (2013.01); *H04L 43/04* (2013.01)

(58) Field of Classification Search
CPC ................................ H04L 41/12; H04L 43/04
USPC ........................................................ 709/223
See application file for complete search history.

(56) References Cited

U.S. PATENT DOCUMENTS

| | | | | |
|---|---|---|---|---|
| 2010/0020722 A1* | 1/2010 | Farkas | ................ | H04L 12/4641 370/254 |
| 2011/0261720 A1* | 10/2011 | Diab | .................. | H04L 41/0873 370/254 |
| 2013/0275566 A1* | 10/2013 | Huth | ....................... | H04L 41/12 709/220 |
| 2014/0133358 A1* | 5/2014 | Yin | ..................... | H04L 41/0893 370/254 |
| 2014/0321460 A1* | 10/2014 | Kaneko | .................. | H04L 49/65 370/386 |
| 2015/0156072 A1* | 6/2015 | Kirrmann | ............. | H04L 41/046 370/254 |
| 2016/0127197 A1* | 5/2016 | Yethadka | ................ | H04L 41/12 709/224 |

OTHER PUBLICATIONS

MELLANOX/MLXSW—"Link Layer Discovery Protocol", 2 pages, Jul. 7, 2016. https://github.com/Mellanox/mlxsw/wiki/Link-Layer-Discovery-Protocol.
802.1AB—IEEE Standard for "Local and Metropolitan Area Networks; Station and Media Access Control Connectivity Discovery", 172 pages, May 6, 2005.

* cited by examiner

*Primary Examiner* — Hee Soo Kim
(74) *Attorney, Agent, or Firm* — Kligler & Associates

(57) ABSTRACT

Communication apparatus includes a plurality of ports, including at least a first port configured to transmit and receive first data packets over a network in accordance with a network-layer protocol to and from a network management station, and a second port configured to be connected to a neighboring unmanaged device so as to transmit and receive second data packets to and from the unmanaged device in accordance with a link-layer protocol. A processor is configured to receive telemetry data from the unmanaged device via the second port in accordance with the link-layer protocol, to aggregate the received telemetry data in a memory, and to report the aggregated telemetry data to the network management station via the first port in accordance with the network-layer protocol.

20 Claims, 3 Drawing Sheets

```
                                  60
                                 /
    62                        64  3
 0               1          2     
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type = 0x7E              |        Length = 229            |
+-+-+-+-+-+-+-+-+-+-+-+-+-+-+-+-+-+-+-+-+-+-+-+-+-+-+-+-+-+-+-+-+
|                 Vendor-Id = 101(rx_counters)                   |
+-+-+-+-+-+-+-+-+-+-+-+-+-+-+-+-+-+-+-+-+-+-+-+-+-+-+-+-+-+-+-+-+
| String =                                                       |
| rx_pkts 269654                                              66 |
| rx_uc_pkts 2552                                                |
| rx_mc_pkts 267001                                              |
| rx_bc_pkts 101                                                 |
| rx_bytes 30143731                                              |
| rx_err_pkts 0                                                  |
| rx_discard_pkts 0          68                                  |
| rx_fcs_err 0                                                   |
| rx_undersize_pkts 0                                            |
| rx_oversize_pkts 0                                             |
| rx_paus   e_pkts 0                                             |
| rx_unknown_ctrl_oc 0                                           |
| rx_symbl_err 0                                                 |
+-+-+-+-+-+-+-+-+-+-+-+-+-+-+-+-+-+-+-+-+-+-+-+-+-+-+-+-+-+-+-+-+
```

FIG. 3A

```
                                  70
                                 /
    72                        74  3
 0               1          2     
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type = 0x7E              |        Length = 220            |
+-+-+-+-+-+-+-+-+-+-+-+-+-+-+-+-+-+-+-+-+-+-+-+-+-+-+-+-+-+-+-+-+
|                 Vendor-Id = 102(tx_counters)                   |
+-+-+-+-+-+-+-+-+-+-+-+-+-+-+-+-+-+-+-+-+-+-+-+-+-+-+-+-+-+-+-+-+
| String =                                                       |
| tx_pkts 383158                                              76 |
| tx_uc_pkts 100                                                 |
| tx_mc_pkts 380506                                              |
| tx_bc_pkts 2552                                                |
| tx_bytes 37993172                                              |
| tx_discard_pkts 0                                              |
| tx_pause_pkts 0            78                                  |
| tx_wait 0                                                      |
| tx_wait_usec 0                                                 |
| tx_q_depth_TC0 0                                               |
| tx_q_depth_TC1 0                                               |
| tx_q_depth_TC2 0                                               |
| tx_q_depth_TC3 0                                               |
+-+-+-+-+-+-+-+-+-+-+-+-+-+-+-+-+-+-+-+-+-+-+-+-+-+-+-+-+-+-+-+-+
```

FIG. 3B

TELEMETRY FOR SERVERS AND DEVICES USING A LINK-LAYER PROTOCOL

FIELD OF THE INVENTION

The present invention relates generally to packet communication networks, and particularly to apparatus and methods for monitoring performance of components of packet networks.

BACKGROUND

Packet communication networks typically use a layered approach in defining the protocols according to which nodes in the network, such as switches and host computers, communicate with one another. The definition of the layers generally follows the well-known Open systems Interconnection (OSI) model. In this model, the data link layer (Layer 2 in the OSI model) provides node-to-node data transfer between a pair of directly-connected (i.e., neighboring) network nodes. The network layer (Layer 3 in the OSI model) provides the facilities for transferring data packets from one node to another in different networks. In a Layer 3 network every node has an address, and nodes are able to transfer messages to other nodes simply by specifying the address of the destination node and letting the network route the message via intermediate nodes to the destination. Common data link protocols include Ethernet and Wi-Fi, as specified by the IEEE 802 family of standards; while the Internet Protocol (IP) family is most commonly used at the network layer.

A variety of protocols have been developed and standardized for purposes of facilitating the control and management of packet networks. For example, at the data link layer, the Link Layer Discovery Protocol (LLDP) is used by network devices to advertise their identity, capabilities, and neighbors on an IEEE 802 local area network. The details of LLDP are defined in IEEE standard 802.1AB. LLDP information is sent by devices to their neighbors on the network at fixed intervals in the form of Ethernet frames, containing a sequence of type-length-value (TLV) structures. Standard TLV types, for example, identify the chassis ID, port ID, port description, system name, description and capabilities, and management address. IEEE standard 802.1AB also permits organizations to specify their own organizationally-specific (custom) TLVs.

At the network layer, the Simple Network Management Protocol (SNMP) is commonly used for collecting and organizing information about managed devices on IP networks and for modifying that information to change device behavior. SNMP is a part of the IP protocol suite and is described by a series of Requests for Comments (RFCs) promulgated by the Internet Engineering Task Force (IETF). SNMP organizes management data in a management information base (MIB), which can then be remotely queried and manipulated by a network management station. Network nodes that implement an SNMP interface are referred to as "managed devices" and run a network-management software module, referred to as an "agent," which collects management information and translates it into an SNMP-specific form. Managed devices communicate over the network with the network management station by sending and receiving IP packets with SNMP payloads.

SUMMARY

Embodiments of the present invention that are described hereinbelow provide improved methods for monitoring components of a network, as well as apparatus implementing such methods.

There is therefore provided, in accordance with an embodiment of the invention, communication apparatus, including a plurality of ports, which include at least a first port configured to transmit and receive first data packets over a network in accordance with a network-layer protocol to and from a network management station, and a second port configured to be connected to a neighboring unmanaged device so as to transmit and receive second data packets to and from the unmanaged device in accordance with a link-layer protocol. The apparatus includes a memory and a processor, which is configured to receive telemetry data from the unmanaged device via the second port in accordance with the link-layer protocol, to aggregate the received telemetry data in the memory, and to report the aggregated telemetry data to the network management station via the first port in accordance with the network-layer protocol.

In some embodiments, the network-layer protocol is an Internet Protocol (IP), and the link-layer protocol is a member of an IEEE 802 family of standards. In a disclosed embodiment, the processor is configured to receive the telemetry data from the unmanaged device in accordance with a Link-Layer Discovery Protocol (LLDP). Additionally or alternatively, the processor is configured to transmit the aggregated telemetry data to the network management station in accordance with a Simple Network Management Protocol (SNMP).

In some embodiments, the telemetry data include a count of at least one of transmitted packets, received packets, transmitted data, and received data. Additionally or alternatively, the telemetry data include a number of discarded packets and/or one or more counts of erroneous packets received by the unmanaged device. Further additionally or alternatively, the telemetry data include an indication of a length of a queue in the unmanaged device.

Typically, the telemetry data are received from the unmanaged device periodically, without querying of the unmanaged device by the processor.

In the disclosed embodiments, the unmanaged device is selected from a group of devices consisting of a network switch and a host computer.

There is also provided, in accordance with an embodiment of the invention, a method for communication, which includes transmitting and receiving first data packets over a network in accordance with a network-layer protocol via a first port of a managed device to and from a network management station. The managed device receives via a second port second data packets containing telemetry data transmitted in accordance with a link-layer protocol from a neighboring unmanaged device. The received telemetry data are aggregated in a memory of the managed device and reported to the network management station via the first port in accordance with the network-layer protocol.

There is additionally provided, in accordance with an embodiment of the invention, a method for monitoring, which includes assembling telemetry data in an unmanaged device and periodically transmitting the assembled telemetry data over a communication link in accordance with a link-layer protocol to a neighboring managed device.

Typically, the assembled telemetry data are transmitted without querying of the unmanaged device, for example in accordance with a Link-Layer Discovery Protocol (LLDP).

The present invention will be more fully understood from the following detailed description of the embodiments thereof, taken together with the drawings in which:

BRIEF DESCRIPTION OF THE DRAWINGS

FIGS. 3A and 3B are block diagrams that schematically illustrate TLV structures for use in monitoring components of a network system, in accordance with an embodiment of the invention.

DETAILED DESCRIPTION OF EMBODIMENTS

Figure 1:
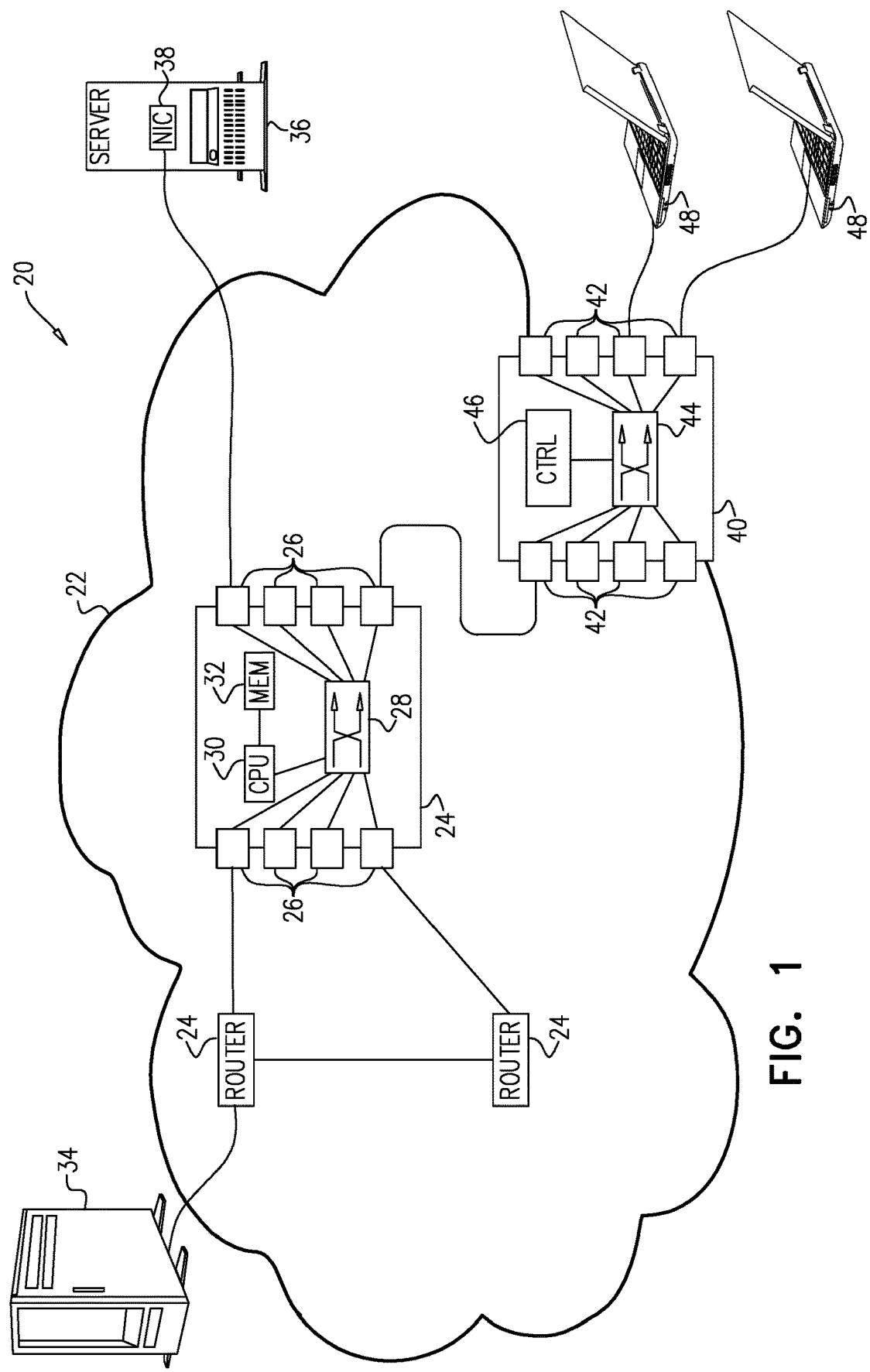
FIG. 1 is block diagram that schematically illustrates a computer network system, which is monitored in accordance with an embodiment of the invention.

Telemetry is an important element in monitoring the operation of a large network system. The term "telemetry" in this context means collection, by a remote entity such as a network management station, of data regarding the performance of system components, such as switches of various types (including routers) and servers. Such "performance" in the present context refers particularly to handling of packets by the system components, such as numbers of packets transmitted and received, volumes of data transmitted and received, packets discarded or delayed in transit, variations in these sorts of parameters over time, and other statistical indicators. The network management station processes the telemetry data in order to identify problems and potential faults, so that remedial action can be applied when and where it is required.

Managed devices in IP networks are well suited to this sort of telemetry, as the management station can collected the required information simply by querying the SNMP local agents, using the SNMP interface supported by the managed devices. The local agents respond by reading the required information from their MIB and sending IP packets over the network back to the management station.

This model, however, cannot readily be implemented in unmanaged devices, i.e., devices that do not have an SNMP interface or agent. Unmanaged devices of this sort may include, for example, servers that are connected to the network by an unmanaged network interface controller (NIC), as well as link-layer switches, such as Ethernet bridges, that serve a local area network (LAN) without IP routing facilities. Upgrading the communication and reporting capabilities of such devices to enable them to communicate with the SNMP management station typically requires substantial and costly modifications to the device software and possibly hardware, as well. Furthermore, opening an unmanaged device to remote management can raise security concerns for the owner of the device. Therefore, in many networks, the performance of unmanaged devices cannot readily be taken into account in the network management picture.

Embodiments of the present invention that are described herein address these difficulties by enabling managed devices in a network to collect telemetry data from their unmanaged neighbors using a link-layer protocol. The managed devices aggregate the telemetry data that they receive in this manner, and then report it to a network management station using a network-layer protocol. For example, in common network environments in which the link-layer protocol is a member of the IEEE 802 family of standards (such as Ethernet), and the network-layer protocol is IP, the unmanaged devices can use LLDP to report the telemetry data to their managed neighbors, which can then transmit the aggregated telemetry data to the network management station using SNMP.

This novel mode of telemetry can be introduced simply by defining additional data types, for example in the form of LLDP custom TLVs, and programming the unmanaged devices in the network system to include these data types in the regular periodic reports that they transmit automatically to their neighbors. Reporting of telemetry data in this fashion is supported, in other words, by existing link-layer protocols, and does not require that the unmanaged devices be prepared to receive and respond to any sort of query. Thus, a network management station can monitor the performance of unmanaged devices without requiring that these devices run an addressable management agent or even have network-layer connectivity or a network address. This automatic, unsolicited reporting of telemetry data by unmanaged devices to their immediate neighbors, as provided by embodiments of the present invention, also alleviates security concerns that might otherwise arise if the unmanaged devices were required to respond to remote queries, as in SNMP.

FIG. 1 is block diagram that schematically illustrates a computer network system 20, which is monitored in accordance with an embodiment of the invention. System 20 is built around a network 22, for example an IP network, comprising multiple interconnected routers 24, one of which is illustrated in detail. Each router 24 comprises multiple ports 26, which are interconnected by routing and switching logic 28. Ports 26 typically comprise suitable physical layer (PHY) and medium access control (MAC) interfaces, as are known in the art, for receiving and transmitting data packets from and to the network. Ports are typically bidirectional, both receiving and transmitting packets; but alternatively, some or all of the ports may be configured exclusively as ingress interfaces or egress interfaces. One or more of ports 26 are configured and connected to transmit and receive data packets to and from a network management station 34 over network 22 in accordance with a network-layer protocol, for example IP packets, as is known in the art. Network management station 34 is typically implemented in a software process running on a suitable server.

Routing and switching logic 28 comprises digital logic circuits, which may be hard-wired or programmable and are configured to carry out standard routing and switching functions that are known in the art. In addition, router 24 comprises a memory 32 and a processor 30, such as an embedded central processing unit (CPU), which is programmed in software to carry out higher-level functions, including the network management and telemetry functions that are described herein. Router 24 typically comprises a single integrated circuit chip, for example an application-specific integrated circuit (ASIC), comprising ports 26, logic 28, processor 30, and memory 32. Alternatively, router 24 may be implemented in a set of two or more chips that carry out the requisite functions.

Another port or ports 26 of router 24 can be configured and connected to transmit and receive data packets to and from neighboring unmanaged devices in accordance with a link-layer protocol, for example an Ethernet protocol. Typical unmanaged devices that are shown in FIG. 1 include a host computer, for example a server 36, and an Ethernet switch 40. Server 36 connects to network 22 via a network interface controller (NIC) 38. Switch 40 comprises multiple ports 42, which are interconnected by switching logic 44. Ports 42 can be similar in implementation to ports 26 of router 24, and switching logic 44 similarly comprises suitable hardware logic circuits, as are known in the art. In the pictured example, switch 40 connects local host computers 48 to network 22.

Router 24 is a managed device, and thus runs a software agent on processor 30 that supports data aggregation and reporting to management station 34, for example using SNMP. Switch 40, which is an unmanaged device, comprises an embedded microcontroller 46, which supports basic data collection and reporting functions but is not configured for IP communications or SNMP support. In the present embodiment, microcontroller 46 assembles telemetry data with regard to the operation of switch 40 and reports the assembled telemetry data periodically by transmitting link-layer messages, for example using LLDP, via one of ports 42 to a corresponding port 26 of its neighboring router 24. Processor 30 in router 24 receives the telemetry data from switch 40, aggregates the received telemetry data in memory 32, and then reports the aggregated telemetry data to network management station 34 via an appropriate port 26 in accordance with SNMP or another applicable network-layer protocol.

Router 24 can collect telemetry data from server 36 in a similar fashion. In this case, the telemetry data can be collected and reported either by NIC 38, for example by means of an embedded processor (not shown) within the NIC running appropriate software or firmware, or by NIC driver software running on the CPU of server 36 itself. The mode of periodic reporting by server 36, typically using LLDP, is similar to that described above with reference to switch 40.

Figure 2:
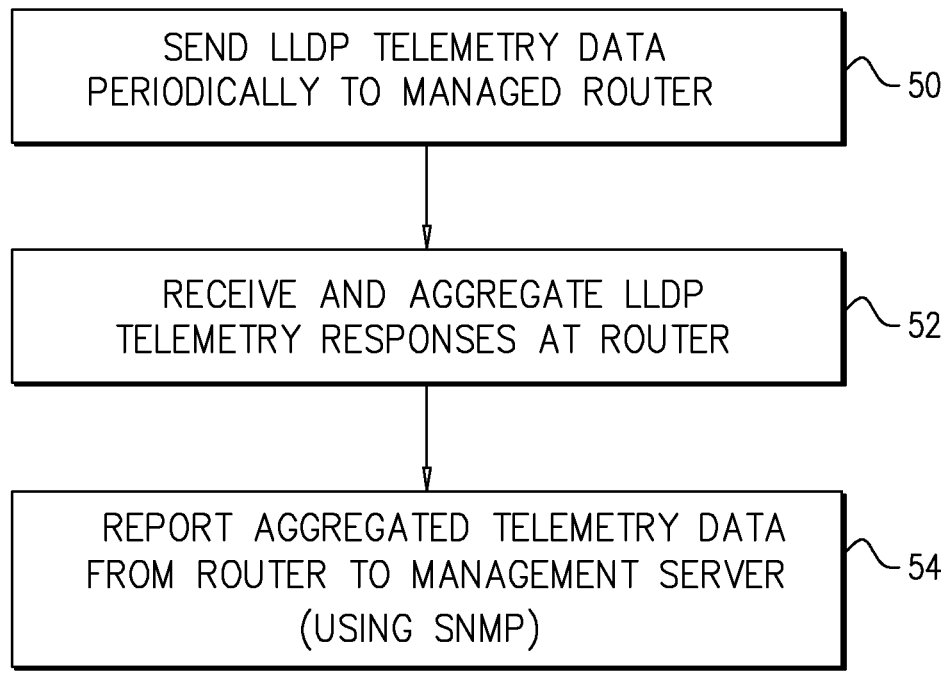
FIG. 2 is a flow chart, which schematically illustrates a method for network monitoring, in accordance with an embodiment of the invention.

FIG. 2 is a flow chart, which schematically illustrates a method for network monitoring, in accordance with an embodiment of the invention. The method is described, for the sake of concreteness and clarity, with reference to the elements of system 20, and specifically referring to telemetry data reported by switch 40 to router 24 using LLDP. Other unmanaged devices, such as server 36, can report telemetry data in the same fashion. The principles of this method, however, are by no means limited to the specific environment and protocols used in the present example, but rather can be applied, mutatis mutandis, in other sorts of network systems, using other suitable link-layer protocols. Implementation in LLDP has the advantage, however, of leveraging capabilities and protocol support that are already present in many network devices.

Switch 40 assembles telemetry data and periodically transmits data packets containing these data to router 24 over the communication link between respective ports 42 and 26, in accordance with the applicable link-layer protocol, at a telemetry transmission step 50. As noted earlier, switch 40 transmits the data automatically, without requiring any sort of query from router 24 or any other entity in system 20 (and in fact without being configured to accept or respond to any such query). In the present example, switch 40 transmits the telemetry data as an extension of its regular LLDP reporting to its neighbors, including router 24, in appropriate Ethernet data frames.

As explained above in the Background section, LLDP defines a set of standard TLVs, which switch 40 (and other devices compliant with the IEEE 802 standards) are required to support, such as chassis ID, port ID, and time to live. To enable reporting of telemetry data, as well, microcontroller 46 is programmed to support custom telemetry-related TLVs, which specify the types of telemetry data to be collected and reported, for example:
  Counts of transmitted and/or received packets;
  Counts of bytes of transmitted and/or received data;
  Numbers of packets discarded by the switch;
  Numbers of erroneous packets received by the switch;
  Lengths of queues in the switch.
Examples of two such TLVs are shown in FIGS. 3A/B. Other telemetry-related TLVs will be apparent to those skilled in the art after reading the present description and are considered to be within the scope of the present invention.

In many commercially-available switches, microcontroller and the other components of switch 40 are already configured to collect and maintain certain counts for diagnostic purposes, such as those listed above. Such counts can thus be added to the existing LLDP reporting capability of the switch with little or no modification to the existing switch hardware.

Router 24 receives the packets containing the LLDP telemetry data from switch 40, at a data reception step 52. Processor 30 in router 24 aggregates the received telemetry data in memory 32, for example as records in the SNMP MIB maintained by router 24. Router 24 similarly receives and aggregates telemetry data from other unmanaged neighbors, such as server 36.

Router 24 reports the aggregated telemetry data to network management station 34, at a reporting step 54. The reports are sent in accordance with the applicable network-layer protocol, for example as IP packets containing SNMP responses to queries sent out by the network management station. The network management station is thus able to receive and assemble diagnostic data not only from managed devices, such as routers 24, but also from unmanaged devices, such as server 36 and switch 40.

FIGS. 3A and 3B are block diagrams that schematically illustrate TLV structures 60 and 70, respectively, for use in monitoring components of a network system, in accordance with an embodiment of the invention. In system 20, for example, server 36 and/or switch 40 can be programmed to generate periodic LLDP reports to router 24 that include one or both of TLV structures 60 and 70.

TLV structure 60 comprises a type field 62 and a length field 64, followed by a value section containing a vendor ID field 66 and telemetry data 68. The vendor ID in field identifies this TLV as a report of receive counter values. The counter values in data 68 include, for example, the total number of received packets since the last report (or over some other specified time period), as well as total numbers of packets of different, specified types, including various sorts of erroneous, discarded, and ill-formed packets. Another counter value indicates the total number of bytes, i.e., the total volume of data received within the time period in question.

TLV structure 70 likewise comprises a type field 72 and a length field 74, along with a vendor ID field 76 and telemetry data 78. Vendor ID 76 in this case identifies the TLV as a report of transmit counter values, and the counter values in data 78 indicate numbers of transmitted packets, including the total number, as well as packets of various types. In addition, data 78 include measures of queue length, i.e., the numbers of patents waiting in the egress queues of different ports 42 at a specified time.

Other sorts of telemetry reports and data structures will be apparent to those skilled in the art after reading the above description and are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a plurality of ports, including at least a first port configured to transmit and receive first data packets over a network in accordance with a network-layer protocol to and from a network management station, and a second port configured to be connected to a neighboring unmanaged device so as to transmit and receive second data packets to and from the unmanaged device in accordance with a link-layer protocol;
a memory; and
a processor, which is configured to receive telemetry data from the unmanaged device via the second port in accordance with the link-layer protocol, to aggregate the received telemetry data in the memory, and to report the aggregated telemetry data to the network management station via the first port in accordance with the network-layer protocol,
wherein the telemetry data are selected from a group of data consisting of:
a count of at least one of transmitted packets, received packets, transmitted data, and received data;
a number of discarded packets;
one or more counts of erroneous packets received by the unmanaged device; and
an indication of a length of a queue in the unmanaged device.

2. The apparatus according to claim 1, wherein the network-layer protocol is an Internet Protocol (IP), and the link-layer protocol is a member of an IEEE 802 family of standards.

3. The apparatus according to claim 2, wherein the processor is configured to receive the telemetry data from the unmanaged device in accordance with a Link-Layer Discovery Protocol (LLDP).

4. The apparatus according to claim 2, wherein the processor is configured to transmit the aggregated telemetry data to the network management station in accordance with a Simple Network Management Protocol (SNMP).

5. The apparatus according to claim 1, wherein the telemetry data comprise the count of at least one of transmitted packets, received packets, transmitted data, and received data.

6. The apparatus according to claim 1, wherein the telemetry data comprise the number of discarded packets.

7. The apparatus according to claim 1, wherein the telemetry data comprise the one or more counts of erroneous packets received by the unmanaged device.

8. The apparatus according to claim 1, wherein the telemetry data comprise the indication of a length of a queue in the unmanaged device.

9. The apparatus according to claim 1, wherein the telemetry data are received from the unmanaged device periodically, without querying of the unmanaged device by the processor.

10. The apparatus according to claim 1, wherein the unmanaged device is selected from a group of devices consisting of a network switch and a host computer.

11. A method for communication, comprising:
transmitting and receiving first data packets over a network in accordance with a network-layer protocol via a first port of a managed device to and from a network management station;
receiving via a second port of the managed device second data packets containing telemetry data transmitted in accordance with a link-layer protocol from a neighboring unmanaged device;
aggregating the received telemetry data in a memory of the managed device; and
reporting the aggregated telemetry data to the network management station via the first port in accordance with the network-layer protocol,
wherein the telemetry data are selected from a group of data consisting of:
a count of at least one of transmitted packets, received packets, transmitted data, and received data;
a number of discarded packets;
one or more counts of erroneous packets received by the unmanaged device; and
an indication of a length of a queue in the unmanaged device.

12. The method according to claim 11, wherein the network-layer protocol is an Internet Protocol (IP), and the link-layer protocol is a member of an IEEE 802 family of standards.

13. The method according to claim 12, wherein receiving the second data packets comprises receiving the telemetry data from the unmanaged device in accordance with a Link-Layer Discovery Protocol (LLDP).

14. The method according to claim 12, wherein reporting the aggregated telemetry data comprises transmitting the aggregated telemetry data to the network management station in accordance with a Simple Network Management Protocol (SNMP).

15. The method according to claim 11, wherein the telemetry data comprise the count of at least one of transmitted packets, received packets, transmitted data, and received data.

16. The method according to claim 11, wherein the telemetry data comprise the number of discarded packets.

17. The method according to claim 11, wherein the telemetry data comprise the one or more counts of erroneous packets received by the unmanaged device.

18. The method according to claim 11, wherein the telemetry data comprise the indication of a length of a queue in the unmanaged device.

19. The method according to claim 11, wherein receiving the second data packets comprises receiving the telemetry data from the unmanaged device periodically, without querying of the unmanaged device by the processor.

20. The method according to claim 11, wherein the unmanaged device is selected from a group of devices consisting of a network switch and a host computer.

* * * * *